United States Patent
Eckhardt et al.

(10) Patent No.: US 11,416,332 B2
(45) Date of Patent: Aug. 16, 2022

(54) PROTECTION FOR ETHERNET PHYSICAL LAYER

(71) Applicant: Texas Instruments Incorporated, Dallas, TX (US)

(72) Inventors: Ralf Eckhardt, Wiesbaden (DE); Ross Anthony Pimentel, San Francisco, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/187,719

(22) Filed: Feb. 26, 2021

(65) Prior Publication Data

US 2021/0303393 A1    Sep. 30, 2021

Related U.S. Application Data

(60) Provisional application No. 63/000,510, filed on Mar. 27, 2020.

(51) Int. Cl.
     *G06F 11/10*      (2006.01)
     *G06F 13/42*      (2006.01)

(52) U.S. Cl.
     CPC ...... *G06F 11/1004* (2013.01); *G06F 13/4282* (2013.01)

(58) Field of Classification Search
     CPC ... H04L 1/0041; H04L 1/0061; H04L 1/0071; H04L 69/323; G06F 11/1004; G06F 11/1048

See application file for complete search history.

(56) References Cited

U.S. PATENT DOCUMENTS

| | | |
|---|---|---|
| 7,010,469 B2 * | 3/2006 | Anderson ............. H04L 1/0061 702/194 |
| 7,327,754 B2 | 5/2008 | Mills et al. |
| 7,734,859 B2 | 6/2010 | Daniel et al. |
| 7,751,442 B2 | 7/2010 | Chang et al. |
| 7,945,730 B2 | 5/2011 | Daftardar |
| 7,987,405 B2 | 7/2011 | Turner et al. |

(Continued)

OTHER PUBLICATIONS

International Search Report in corresponding PCT Application No. PCT/US2021/024565, dated Jul. 1, 2021 (2 pages).

*Primary Examiner* — Shelly A Chase
(74) *Attorney, Agent, or Firm* — John R. Pessetto; Charles A. Brill; Frank D. Cimino

(57) ABSTRACT

Disclosed embodiments include an Ethernet PHY device comprising a serial communication interface adapted to be coupled to a microcontroller, a register set having registers, and a checksum generator circuit coupled to the register set and configured to calculate a current checksum. The embodiment also includes a checksum register that is coupled to the checksum generator and is configured to store the current checksum. It further includes a checksum checker that is coupled to the checksum generator, the checksum register and the microcontroller, and is configured to compare a previous value of the checksum to the current checksum and, responsive to the previous value being different than the current checksum, send an error report to the microcontroller. The embodiment also includes a trigger circuit coupled to the checksum generator configured to send a checksum start signal to the checksum generator.

20 Claims, 4 Drawing Sheets

(56) References Cited

U.S. PATENT DOCUMENTS

| | | | |
|---|---|---|---|
| 8,774,000 B2 | 7/2014 | Licardie et al. | |
| 2006/0075281 A1 | 4/2006 | Kimmel et al. | |
| 2014/0164647 A1* | 6/2014 | Lee | G06F 13/385 |
| | | | 710/30 |
| 2018/0343327 A1* | 11/2018 | Gaderer | H04L 63/123 |
| 2019/0166027 A1* | 5/2019 | Reinbold | H04L 47/6245 |
| 2019/0385057 A1 | 12/2019 | Litichever et al. | |

* cited by examiner

PROTECTION FOR ETHERNET PHYSICAL LAYER

REFERENCE TO RELATED APPLICATION

This patent arises from an application claiming the benefit of U.S. Provisional Patent Application Ser. No. 63/000,510, which was filed on Mar. 27, 2020. U.S. Provisional Patent Application Ser. No. 63/000,510 is hereby incorporated herein by reference in its entirety. Priority to U.S. Provisional Patent Application Ser. No. 63/000,510 is hereby claimed.

BACKGROUND

Ethernet is a communication protocol for connecting computers together in local area networks, metropolitan area networks and wide area networks. Systems communicating over Ethernet divide a stream of data into shorter pieces called frames. Each frame contains source and destination addresses, and error-checking data.

The physical layer (PHY) defines the means of transmitting raw data bits over a physical data link connecting network nodes. The major functions and services performed by the PHY include performing bit-by-bit or symbol-by-symbol data delivery over a physical transmission medium, and providing a standardized interface to the transmission medium.

Automotive electrical systems are becoming more complex, driven by advancements in infotainment, advanced driver assistance systems (ADAS), power trains and body electronics. These systems require fast communication networks due to the large amount of real-time data and firmware/software being shared between various electronic control units (ECUs) in vehicles.

Automotive Ethernet is a communication network that is used to connect components within a car using a wired network to facilitate fast communication between the components. Ethernet technology is used for in-vehicle communication, transport of measurement and calibration data, diagnostics, and communication between electric vehicles and charging stations.

Additionally, vital functions related to the operation of an automobile are controlled by electronic components using Automotive Ethernet. These electronic components can interfere with the operation and functioning of the car if these components experience a failure. A failure in an automotive electronic component can lead to a dangerous situation for the driver, passengers, and other drivers and pedestrians nearby. These failures can be caused by a flipped data bit or other corrupted data. There are numerous possible sources of data corruption including a software glitch, an electrostatic discharge (ESD) event, effects of alpha radiation, or some other source.

It would be desirable for the microcontroller to take corrective action to repair the data if such a data corruption occurs. However, the data corruption must first be detected for the corrective action to occur. There is a need for additional safety measures to be implemented in the Automotive Ethernet PHY device for the detection and correction of data errors.

SUMMARY

The first disclosed embodiment includes an Ethernet PHY device comprising a serial communication interface adapted to be coupled to a microcontroller, a register set having registers, and a checksum generator circuit coupled to the register set and configured to calculate a current checksum of at least some of the registers. The embodiment also includes a checksum register that is coupled to the checksum generator and is configured to store the current checksum. It also includes a checksum checker that is coupled to the checksum generator, the checksum register and the microcontroller, and is configured to compare a previous value of the checksum to the current checksum and, responsive to the previous value being different than the current checksum, send an error report to the microcontroller. The embodiment further includes a trigger circuit having inputs and having an output coupled to the checksum generator, wherein the trigger circuit is configured to send a checksum start signal to the checksum generator in response to receiving an active signal at an input.

Another example embodiment includes a method for detecting a data corruption in an Ethernet PHY device comprising powering up the Ethernet PHY device, initializing the device and loading a register image into the registers of the device, having a checksum generator in the device read the registers and generate an initial checksum of the registers, and the initial checksum is stored in a checksum register. The method further includes initiating a check of the registers by the checksum generator reading the registers and generating a current checksum of the registers. The current checksum is then compared to the initial checksum to verify that the checksums match.

Example embodiments also include an automotive network transceiver adapted to be coupled to a processor at a transceiver input, the transceiver comprising registers coupled to the transceiver input and adapted to store a copy of data that is stored in the processor. A checksum generator is coupled to the registers, wherein the checksum generator has a checksum output and is configured to perform a checksum operation on a portion of the registers. A checksum register is coupled to the checksum output, and a checksum checker is connected to the checksum generator and the checksum register, the checksum checker configured to compare the checksum output to a previous checksum output and generate an error in response to the checksum output being different than the previous checksum output.

BRIEF DESCRIPTION OF THE DRAWINGS

FIG. 4 shows a checksum trigger circuit.

Figure 1:
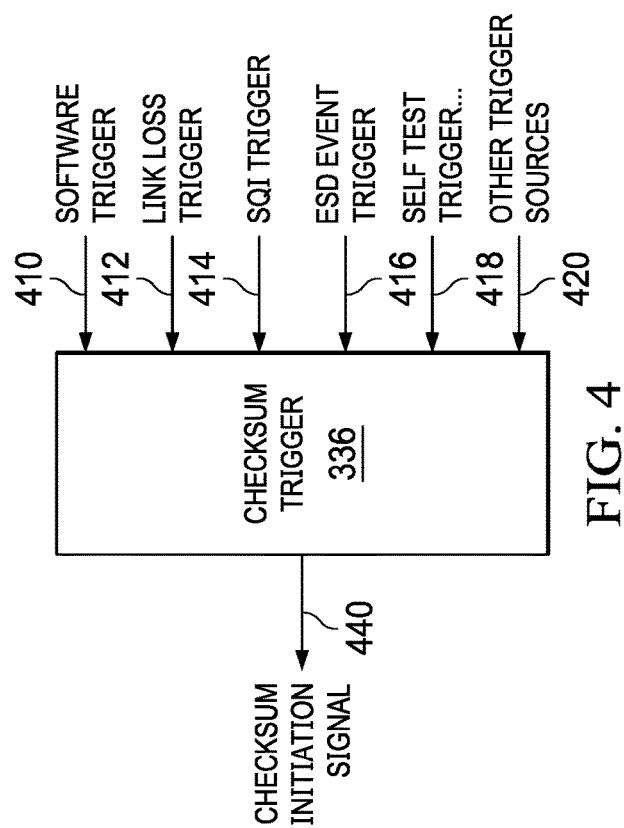
FIG. 1 shows three examples of alternative schemes that can be used to help protect an Ethernet PHY against undetected data corruption in the PHY registers.

The same reference numbers are used in the drawings to depict the same or similar (by function and/or structure) features. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

Ethernet PHY's act as transceivers between digital processing circuits (such as a media access controller, processors, gate arrays and/or storage devices) and analog transmission media (such as buses, wires and/or optical cables). PHY's may be implemented using hardware and software. Ethernet PHY's can have many registers, over two thousand in some cases. Some of the registers are for trimming internal parameters of the PHY to help maintain proper functionality and compliance to the Ethernet specification. Automotive Safety Integrity Level (ASIL) standards require that a valid register configuration be loaded and verified to ensure proper operation of the PHY. However, it is possible that the data values in the PHY register can become corrupted during operation. It is important to detect register configuration changes, such as by a bit flipping or an accidental write operation. If a register change in an automotive PHY is not detected and the proper corrective action is not taken, the operation and functioning of the PHY can be compromised, leading to a potential safety hazard.

One possible method for determining if the contents of the PHY registers have changed is to have the microcontroller (MCU) periodically read back the PHY registers via Management Data Input/Output (MDIO) and compare the current values in the PHY registers to the values in MCU memory for the register image. The drawback to this register readback approach is the cost in MCU time and resources. If the PHY has two thousand registers and each readback operation takes 10-20 msec, a readback of all the registers could require 20-40 sec of MCU time. Also, this register readback approach requires use of the limited memory and processing power on the MCU.

FIG. 1 shows three examples of alternative embodiments that can be used to help protect an Ethernet PHY against undetected data corruption in the PHY registers. Table 100 shows a PHY register block having columns 110, 120, 130 and 140. Column 110 shows the name and/or address of each of the registers in the PHY. Column 120 represents the PHY registers selected to be protected using a register lock. Column 130 represents the PHY registers selected to be protected using a checksum. Column 140 represents the PHY registers selected to be protected using a parity bit or error correction code (ECC).

The decision of whether a given register is to be protected by register lock 120, checksum 130, and/or ECC 140 can be made at design time (e.g. when the PHY is designed and/or fabricated). In some instances, that decision can even be made for some registers at runtime (e.g. when the PHY is actually operating). If the register participation decision is made at design time, either all of the registers can be selected, or else a selection bit can be added to the register providing a second selection point at runtime, as well as an opportunity to include a subset of the registers in the protection method. Any given register can be protected by one, two, or all three of protection schemes 120, 130 and 140.

There are two types of registers in the PHY register set, configuration registers and status registers. Generally, only the configuration registers need to be protected or checked for data corruption because the status registers are expected to change, which would make each of methods 120-140 more cumbersome to use if the status registers were included.

Register lock 120 can be used for the PHY registers that are the most important for the functionality of the PHY, and need to be protected from overwriting. A lock bit can be added to each given configuration register, giving the register an extra bit. This lock bit is used only for register lock. The value of the lock bit (0 or 1) determines whether the register is to be locked. The lock bit can be hard-coded as a static bit in the register whereby the register will always be locked after the register contents are written, or the lock bit can be configured at runtime. Once a register lock bit has been set to active, the register lock can only be released or the register contents rewritten by a reset, either a hardware or software reset depending upon the configuration.

In some implementations, the register lock can only be released or the register contents rewritten by using a key. The use of a key allows the register to be rewritten without going through a reset cycle, while still maintaining the desired protection. The key for the register lock can be an 8-bit key or a 16-bit key in some cases, and must be written to the register to release the register lock. The register lock prevents the contents of the register from being overwritten accidentally by software.

Parity or ECC 140 can be used for protection of important configuration registers in the PHY that could be overwritten by a software glitch, noise, ESD spike, radiation introducing soft errors (SER), or similar issues. Parity refers to the evenness or oddness of the number of bits having a value of one within a given set of bits, and is thus determined by the value of all the bits. The parity bit checks whether the total number of 1-bits in the string is even for even parity or odd for odd parity. Parity can be calculated by an exclusive-OR (XOR) sum of the bits, yielding a 0 for even parity or a 1 for odd parity. Incorrect register contents can be detected with the addition of one or two parity bits to each register that is to be protected in this manner. This property of parity being dependent upon all the bits and the value changing if there is a change in any single bit makes parity useful for error detection.

A parity check detects a data corruption, but does not correct the error in the data. ECC detects and corrects the data corruption. ECC requires redundant bits that are a function of the data in the register, and is accomplished using an algorithm. There are numerous types of ECC algorithms such as Hamming codes, single-error correction and double-error detection (SECDED), multi-dimensional parity, and Reed-Solomon coding. A selection of whether a given register will be protected by parity or ECC 140 can be made at design time or at runtime. This selection can also include whether 1-bit parity, 2-bit parity, or an ECC algorithm will be used. In some cases where ECC is used, a code describing the data bit sequence is calculated and stored along with the data. When the data is read, an ECC code for the read data is calculated and compared to the original ECC code. If the codes match, the data is deemed to be uncorrupted. If the codes do not match, the stored ECC code is used to rewrite the data in the register. Additional bits must be added in the PHY register to accommodate the ECC code. The circuitry used to calculate the ECC code can be internal or external to the PHY.

A checksum 130 can be used for the PHY registers that are important for the functionality or performance of the PHY device. The decision of what registers to include in the checksum can be made either at design time or at runtime. A selection bit can be added to the register, allowing the selection of the participating registers at configuration or runtime. When the checksum generator runs the checksum, the checksum generator provides the checksum of only the registers that have been selected to participate in the checksum protection.

Two examples for generating a PHY register checksum that will be used later for comparison to a checksum of the current PHY register contents include: 1) generating a checksum external to the PHY using checksum generator software at compile time; or 2) providing a hardware checksum circuit within the PHY device to read the PHY register contents and generate a checksum during startup after the registers are loaded.

Figure 2:
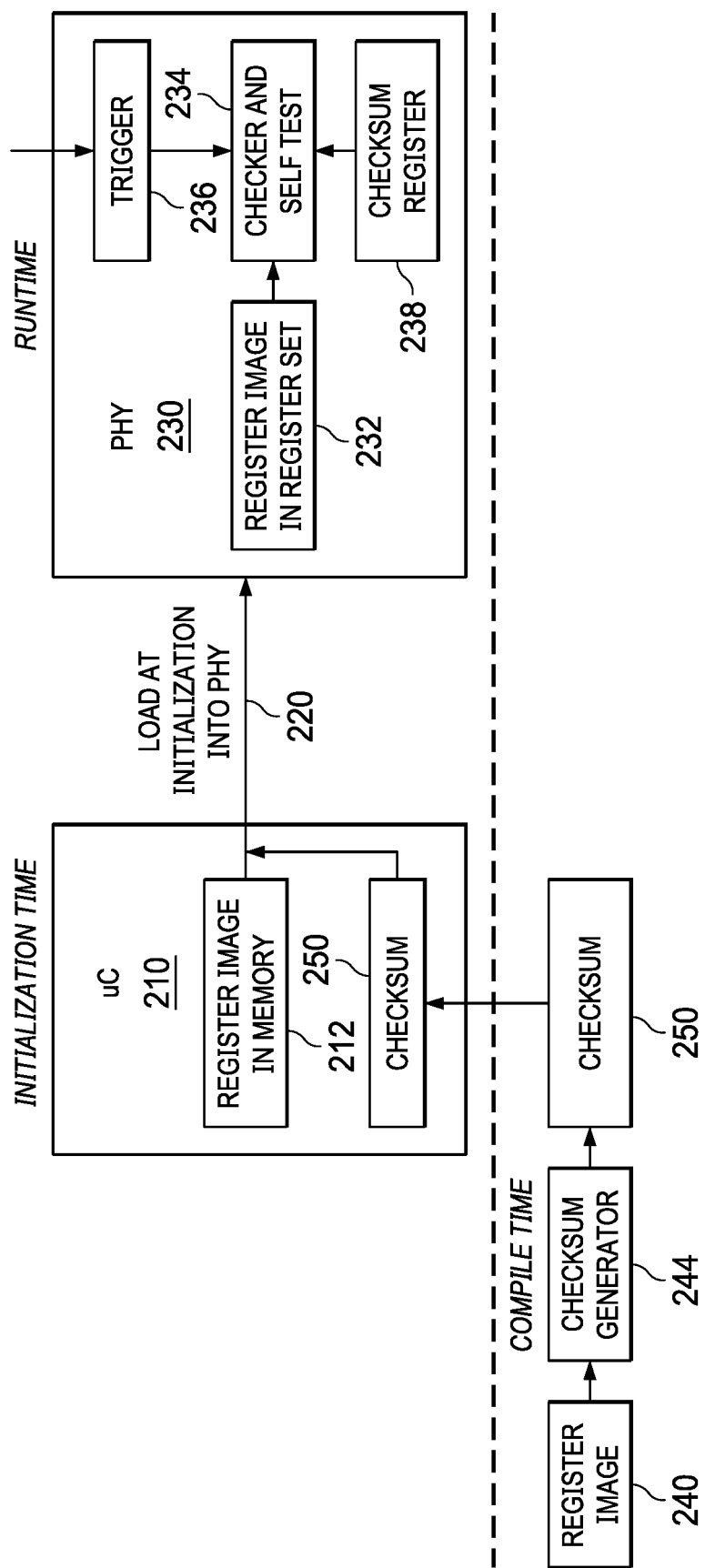
FIG. 2 shows an example system for using a checksum of the PHY register contents to detect a data corruption in a PHY register.

FIG. 2 shows an example system for using a checksum of the PHY register contents to detect a data corruption in a PHY register. In the example of FIG. 2, the checksum generation is performed external to the PHY using a checksum generation software tool at compile time.

The contents of the PHY configuration registers are determined by design and characterization prior to compiling the code that will be loaded into the microcontroller. Once the contents of the PHY configuration registers are determined, the data is loaded into the checksum generator 244 as a PHY register image 240. The checksum generator 244 calculates a checksum 250 of the PHY register image 240 using a suitable checksum algorithm such as e.g. cyclic redundancy check (CRC).

Register image 240 is loaded (not shown) into memory 212 of the microcontroller 210 prior to system initialization. The microcontroller 210 could also be a digital signal processor, microprocessor, or a system-on-a-chip. The checksum 250 is also loaded into the microcontroller 210 prior to system initialization. The PHY device 230 is coupled to the microcontroller 210 by an MDIO interface 220. The microcontroller 210 loads the PHY register image into the PHY registers 232 during system initialization via the serial MDIO Interface 220 following startup. The checksum 250 is also loaded at startup from the microcontroller 210 to the dedicated checksum register 238 in the PHY device 230 as part of the initialization process.

After all of the PHY registers are loaded, the registers that have been selected to be protected by register lock 120 can be locked if desired, preventing the locked registers from being rewritten by software without the use of a key or the execution of a reset. The checksum of the register set can include both locked and unlocked registers because each of the methods 120-140 can be implemented independent of each other.

A checksum checker 234 is coupled to the register set 232. During runtime, the checksum checker 234 can verify the PHY register contents by reading the selected registers or the complete register set 232, calculating a current value of the checksum for those registers, and comparing the current checksum to the saved checksum in the checksum register 238. Several different event trigger sources 236, both internal and external to the PHY device 230, can trigger running a check of the checksum. If a checksum failure is detected, the failure can be reported to the microcontroller 210, and the microcontroller can take corrective action, e.g. system reset or reloading the PHY register set 232 via the MDIO 220.

Figure 3:
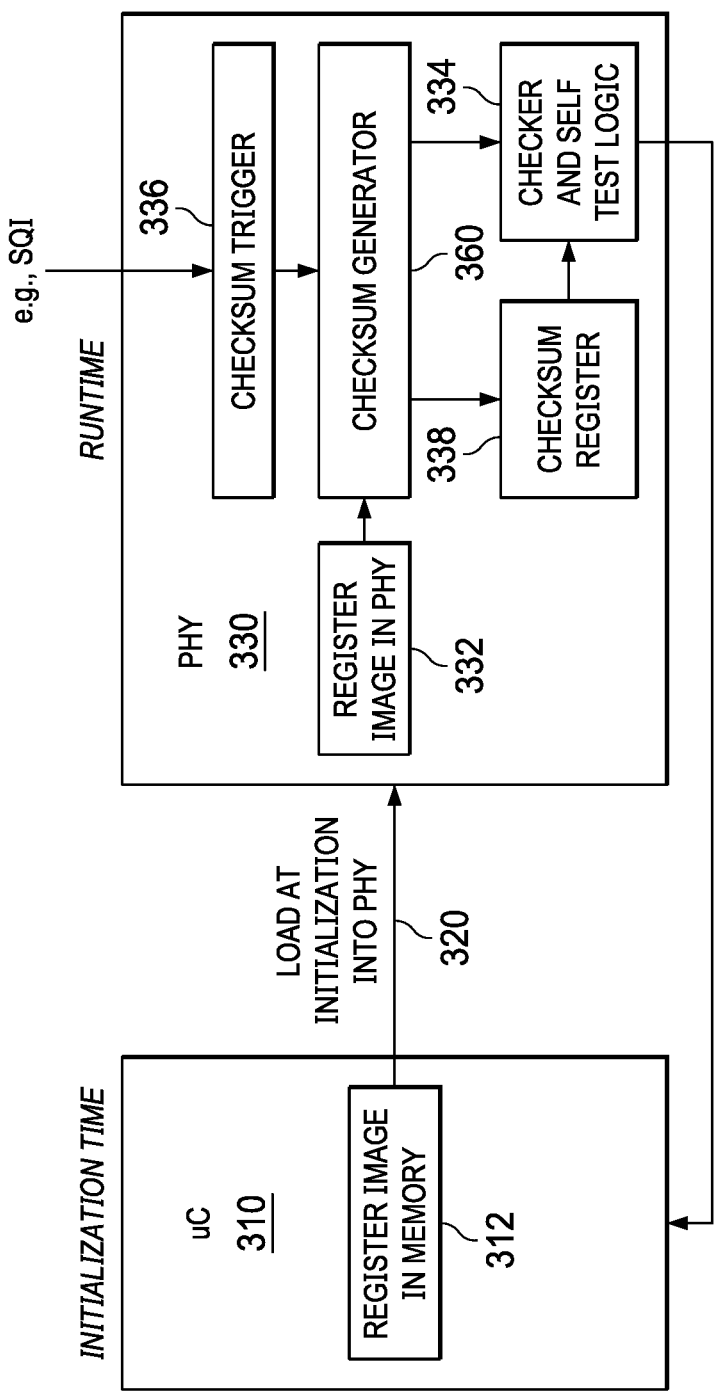
FIG. 3 shows an example system for using a checksum of the PHY register contents to detect data corruption in a PHY register in which the checksum generation is done internal to the PHY.

FIG. 3 shows an example system for using a checksum of the PHY register contents to detect data corruption in a PHY register in which the PHY includes hardware checksum generator circuitry, and the checksum generation is done internal to the PHY using the checksum generator.

The contents of the PHY configuration registers are determined by design and characterization prior to initialization. Once the contents of the PHY configuration registers are determined, they are loaded into the memory 312 of the microcontroller 310 as a PHY register image. The microcontroller 310 could also be a digital signal processor, microprocessor, or a system-on-a-chip.

The PHY device 330 is coupled to the microcontroller 310 by an MDIO interface 320. The microcontroller 310 loads the PHY register image into the PHY registers 332 as an initialization table during system initialization via the serial MDIO Interface 320 following startup.

The PHY registers 332 are coupled to a checksum generator 360. After the registers are loaded, the checksum generator 360 calculates a checksum of the contents of the PHY register 332 using a suitable checksum algorithm such as e.g. cyclic redundancy check (CRC). The checksum is stored in a checksum register 338 that is coupled to the checksum generator 360. A checksum checker 334 has a first input coupled to the checksum generator 360 and a second input coupled to the checksum register 350. The checker 334 has an output coupled to the microcontroller 310.

The register image is loaded to the PHY registers 332 from the memory 312 in microcontroller 310 via MDIO 320 during initialization of the PHY 330. The checksum generator 360 is a state machine that reads the contents of the PHY registers 332 and generates a checksum. The generated checksum is stored in the checksum register 338 for later comparison with subsequent checksums to verify whether the checksum has changed.

The checksum generator is coupled to a checksum trigger circuit 336. During runtime, the checksum generator 360 may receive a signal from the checksum trigger 336 instructing it to read the PHY registers 332 and generate a checksum to be compared with the checksum stored in the checksum register 338.

Upon receiving a signal from the checksum trigger circuit 336, the checksum generator 360 reads the PHY registers 332 that have been chosen to be part of the checksum, and generates a checksum of the current PHY register contents. The new checksum is sent by the checksum generator 360 to the checksum checker 334. The checksum checker 334 reads the saved checksum from the checksum register 338, and compares the current checksum to the saved checksum. If the current checksum and the saved checksum do not match, this indicates that the configuration data in the PHY register 332 is corrupted. The checker 334 reports the data corruption to the microcontroller 312 which can then take the appropriate corrective action, which can include reloading the register image in memory 312 to the PHY register set 332.

FIG. 4 shows the checksum trigger circuit 336, which includes trigger inputs 410-420 as inputs and a checksum initiation signal 440 as an output. Any of the trigger inputs 410-420 meeting the predetermined criteria for a valid signal will result in the checksum initialization signal being sent to the checksum generator signal 360. The checksum initialization signal being sent to the checksum generator signal 360 initiates the process of the checksum generator 360 reading the contents of the PHY registers 332 and generating a checksum that is then compared to the checksum stored in the checksum register 338 to determine if the PHY register contents are valid.

The software trigger input 410 can be used for a user-initiated checksum check. This may be performed if the user suspects that an issue or performance problem may have occurred. The software trigger input 410 can also be used to perform periodic checksum checks as a safety measure to confirm system integrity. The software trigger input 410 is a single bit sent from the microcontroller 310, and is a voluntary check to ensure that nothing has changed in the PHY register set.

A link loss trigger 412 may signal a serious failure in the Ethernet System. The link loss trigger 412 is generated internally by the PHY 330 and is triggered when the PHY detects a loss of the link between itself and the system it is communicating with. The PHY is constantly sending and receiving trigger pulses and data, known as the link, to synchronize with the PHYs of the systems it is communicating with. The PHY periodically checks to ensure the link is present. If the PHY senses that the link has been lost, it will set the link loss trigger bit 412.

The loss of the link can have many potential causes. However, a link loss can occur as the result of modified register values, particularly values of registers pertaining to the performance, timing and synchronization of the PHY. In some instances, reloading the PHY register values following a link loss trigger 412 may resolve the link loss problem. If a link loss is detected, a link loss trigger 412 will be set, triggering a checksum check.

Signal quality is constantly monitored in a PHY during runtime. The signal quality indicator (SQI) signal 414 can be generated internally by the PHY 330 and is an indicator that the signal quality has fallen below a predetermined threshold. If the SQI level goes below a certain threshold, it may indicate that the mean square error (MSE) has risen to an unacceptable level. In this case, the transmission may still be present, but with errors.

A potential cause for a lower SQI could be that the register settings related to maintaining a defined signal shape may have been modified or overwritten. In some instances, reloading the PHY register values following an SQI trigger 414 may improve the SQI and resolve the issue. The early detection and correction of a degradation in SQI may prevent a subsequent link loss. For this reason, if the SQI drops below an acceptable SQI threshold, an SQI trigger 414 will be set, triggering a checksum check.

An electrostatic discharge (ESD) event trigger 416 can be sent by an internal ESD event sense detector. An example implementation of an ESD event sense detector can be found in U.S. Pat. No. 10,749,337, which is incorporated herein by reference in its entirety. An ESD event can cause register bits to flip, or otherwise corrupt the data stored in the PHY configuration registers. Early detection of such a data corruption is desired. If an ESD event is detected, the ESD event sense detector generates an ESD event trigger 416, triggering a checksum check.

A self-test mode can be added to the PHY circuitry to verify the proper functionality of the checksum trigger 336, checksum generator 360 and checksum checker 334. The self-test can be initiated by a self-test trigger signal 418. The self-test trigger 418 can be sent by the microcontroller 310 or by circuitry within the PHY. In self-test mode, it is possible to insert fail bits in register settings to trigger the error detection logic without propagating the failure to the rest of the Ethernet system. As part of the self-test, for example, a mechanism could be implemented to generate a wrong checksum, then check to determine that the checksum error is caught and reported to the microcontroller 310. This verification can add safety to the operation of the Ethernet system, which is particularly important in automotive applications.

The list of trigger sources shown in FIG. 4 is not an exhaustive list. Other possible trigger sources 420 can be implemented as well. These other trigger sources 420 can include a timer to initiate frequent register checks. The other trigger sources can be customized as appropriate for an individual Ethernet system environment.

Figure 5:
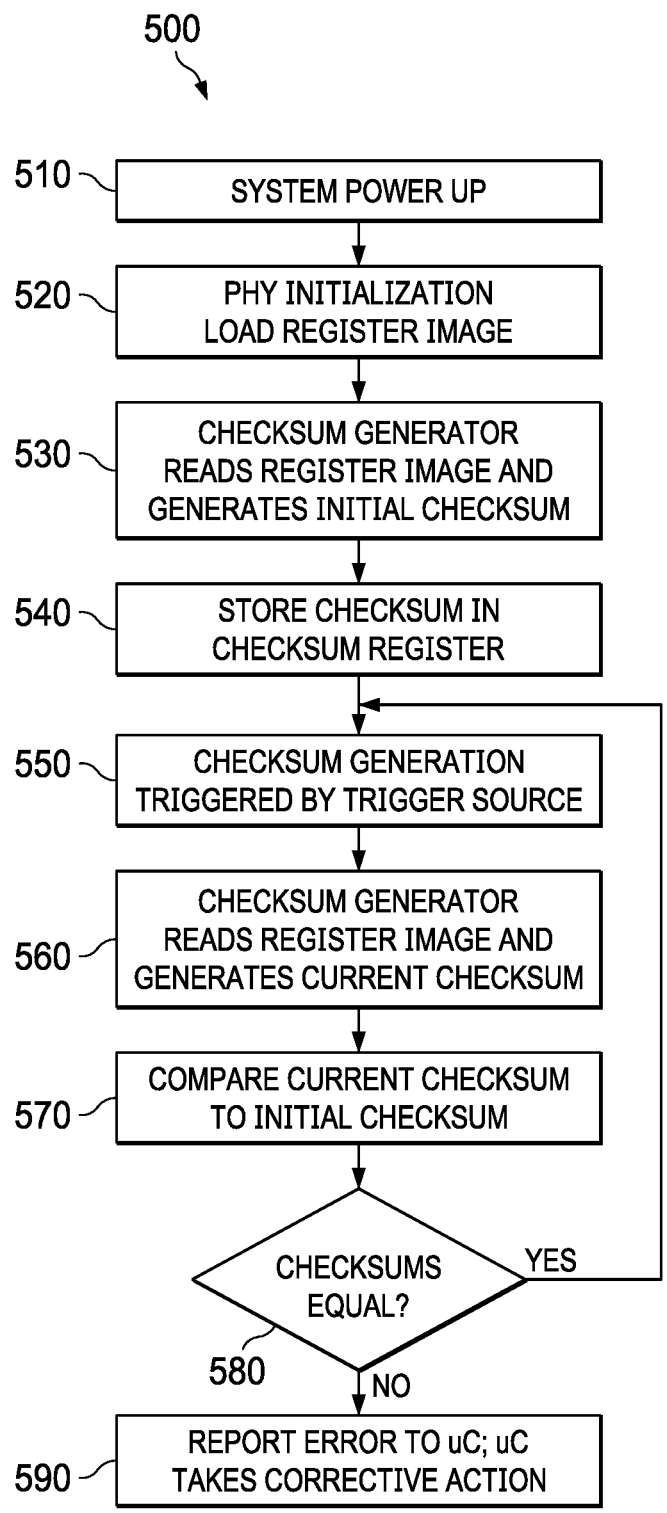
FIG. 5 shows a method for using a checksum of the PHY register contents to detect data corruption in a PHY register.

FIG. 5 shows a method 500 for using a checksum of the PHY register contents to detect data corruption in a PHY register. At 510, the system powers up and power is applied to the microcontroller 310 and the PHY 330. At 520, the PHY is initialized and the register image file is loaded from microcontroller memory 312 to the PHY registers 332.

At 530, the checksum generator reads the contents of the registers and generates an initial checksum, which is stored in the checksum register at 540. At step 550, a checksum trigger source communicates to the checksum generator 360 that the checksum generator needs to read the current contents of the PHY registers 332 and generate a current checksum at step 560. The checksum checker 334 receives the current checksum from the checksum generator and the initial checksum from the checksum register 338 at step 570. If the values of the initial checksum and the current checksum are equal at 580, the process loops back to step 550 and waits for a trigger source to generate the next trigger. If the values of the initial checksum and the current checksum are not equal at 580, the PHY reports the error to the microcontroller, and the microcontroller takes the appropriate corrective action, such as reloading the register image to the register set.

For the purposes of this disclosure, if an element is referred to as being "coupled" to another element, as used herein, it is intended that there is a functional connection (e.g. a direct connection or an indirect connect where one or more intervening elements exist) between the two elements. If a first element is referred to as being "directly coupled" to a second element, no intervening elements are between the first and second elements. The terms "substantially the same," "substantially equal," "substantially equal," "approximately equal," and "approximately the same" describe a quantitative relationship between two objects. This quantitative relationship may prefer the two objects to be equal by design but with the anticipation that a certain amount of variations can be introduced by the fabrication process.

As used herein, the terms "terminal", "node", "interconnection", "lead" and "pin" are used interchangeably. Unless specifically stated to the contrary, these terms are generally used to mean an interconnection between or a terminus of a device element, a circuit element, an integrated circuit, a device or other electronics or semiconductor component.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

While operations are depicted as occurring in a particular order, this should not be understood as requiring that all illustrated operations be performed, or that the operations are required to be performed in that order to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. An Ethernet PHY device comprising:
a serial communication interface adapted to be coupled to a microcontroller;
a register set having one or more registers;

a checksum generator circuit coupled to the register set and configured to calculate a current checksum of at least some of the registers;
a checksum register coupled to the checksum generator and configured to store the current checksum;
a checksum checker coupled to the checksum generator, the checksum register and the microcontroller, and configured to compare a previous value of the checksum to the current checksum and, responsive to the previous value being different than the current checksum, send an error report to the microcontroller; and
a trigger circuit having inputs and having an output coupled to the checksum generator, wherein the trigger circuit is configured to send a checksum start signal to the checksum generator in response to receiving an active signal at an input.

2. The device of claim 1, wherein the serial communication interface is adapted to be coupled to the microcontroller by Management Data Input/Output (MDIO).

3. The device of claim 1, including an electrostatic discharge (ESD) event sense detector configured to provide an ESD trigger signal to one of the trigger circuit inputs.

4. The device of claim 1, wherein the trigger circuit inputs include a software trigger input.

5. The device of claim 1, wherein the trigger circuit inputs include a link loss trigger input configured to provide an active signal if a link loss is detected.

6. The device of claim 1, wherein the trigger circuit inputs include a software quality index (SQI) input configured to provide an active signal if an SQI drops below an SQI threshold.

7. The device of claim 1, wherein the trigger circuit inputs include a self-test trigger configured to initiate a self-test sequence.

8. The device of claim 7, wherein the self-test sequence includes:
a checksum start signal sent by the trigger circuit to the checksum generator;
a self-test checksum generated by the checksum generator responsive to the checksum start signal, wherein the self-test checksum is a checksum of the registers with a fail bit added; and
a failure indication sent by the checksum checker indicating that the self-test checksum does not match the current checksum.

9. A method for detecting a data corruption using hardware in an Ethernet PHY device, comprising:
powering up the Ethernet PHY device;
initializing the PHY device and loading a register image into one or more registers within the PHY device;
reading the registers using a checksum generator in the PHY device;
generating, using the checksum generator, an initial checksum of the registers;
storing the initial checksum in a checksum register in the PHY device;
initiating a check of the registers by the checksum generator reading the registers;
generating, by the checksum generator, a current checksum of the registers; and
comparing the current checksum to the initial checksum to verify that they match.

10. The method of claim 9, wherein if the current checksum and the initial checksum do not match, an error is reported to a microcontroller unit coupled to the device.

11. The method of claim 9, wherein if the current checksum and the initial checksum do not match, the register image is reloaded to the registers.

12. The method of claim 9, wherein if the current checksum and the initial checksum do not match, a system reset is performed.

13. The method of claim 9, wherein the initiating a check of the registers is in response to a link loss.

14. The method of claim 9, wherein the initiating a check of the registers is in response to an electrostatic discharge (ESD) event.

15. The method of claim 9, wherein the initiating a check of the registers is in response to a reduction in a software quality index (SQI).

16. An automotive network transceiver adapted to be coupled to a processor at a transceiver input, the transceiver comprising:
registers coupled to the transceiver input and adapted to store a copy of data stored in the processor;
a checksum generator coupled to the registers, the checksum generator having a checksum output and configured to perform a checksum operation on a portion of the registers;
a checksum register coupled to the checksum output; and
a checksum checker connected to the checksum generator and the checksum register, the checksum checker configured to compare the checksum output to a previous checksum output, and generate an error in response to the checksum output being different than the previous checksum output.

17. The device of claim 16, including a trigger circuit having inputs and having an output coupled to the checksum generator, wherein the trigger circuit is configured to send a checksum start signal to the checksum generator in response to receiving an active signal at an input.

18. The device of claim 17, wherein the trigger circuit inputs include a link loss trigger input configured to provide an active signal if a link loss is detected.

19. The device of claim 17, wherein the trigger circuit inputs include a software quality index (SQI) input configured to provide an active signal if an SQI drops below an SQI threshold.

20. The device of claim 17, wherein the trigger circuit inputs include a software trigger input.

* * * * *